United States Patent
Ahmed et al.

(10) Patent No.: US 11,730,315 B2
(45) Date of Patent: Aug. 22, 2023

(54) PELLET GRILL

(71) Applicant: W.C. BRADLEY CO., Columbus, GA (US)

(72) Inventors: Mallik Ahmed, Columbus, GA (US); Bruce Roberts, Midland, GA (US); Anthony Hamilton, Hamilton, GA (US); Ramin Khosravi Rahmani, Columbus, GA (US); Sleiman Abdallah, Columbus, GA (US); Brad Gillespie, Midland, GA (US); Dan Corso, Columbus, GA (US)

( * ) Notice: Subject to any disclaimer, the term of this patent is extended or adjusted under 35 U.S.C. 154(b) by 137 days.

(21) Appl. No.: 16/653,496

(22) Filed: Oct. 15, 2019

(65) Prior Publication Data
US 2020/0113382 A1   Apr. 16, 2020

Related U.S. Application Data

(60) Provisional application No. 62/745,046, filed on Oct. 12, 2018.

(51) Int. Cl.
*A47J 37/07*   (2006.01)
*F24B 5/02*   (2006.01)
*F24B 13/02*   (2006.01)

(52) U.S. Cl.
CPC ............ *A47J 37/0704* (2013.01); *F24B 5/02* (2013.01); *F24B 5/021* (2013.01); *F24B 13/02* (2013.01)

(58) Field of Classification Search
CPC ............ F24B 5/02; F24B 5/021; F24B 13/02
USPC ....................................................... 126/25 B
See application file for complete search history.

(56) References Cited

U.S. PATENT DOCUMENTS

| | | | |
|---|---|---|---|
| 2,910,930 A | | 11/1959 | Hankoff |
| 3,017,954 A | * | 1/1962 | Kruckewitt ............ F23J 15/022 55/507 |
| 3,606,066 A | * | 9/1971 | Anderson ........... A47J 37/0704 126/25 R |
| 3,623,422 A | | 11/1971 | Marshall |
| 4,810,510 A | | 3/1989 | Lever et al. |
| 4,823,684 A | | 4/1989 | Traeger et al. |
| 4,909,235 A | | 3/1990 | Boetcker |
| 4,966,126 A | | 10/1990 | Wu |

(Continued)

FOREIGN PATENT DOCUMENTS

| | | |
|---|---|---|
| AT | 402850 B | 9/1997 |
| CN | 103989414 B | 5/2016 |

(Continued)

OTHER PUBLICATIONS

Rider 900 Pellet Grill—Product Walkthrough, first available Feb. 19, 2020, YouTube, [online], [site visited Jan. 24, 2022], Available from internet URL: https://www.youtube.com/watch?v=3gBOTUUe22k (Year: 2020).

(Continued)

*Primary Examiner* — Avinash A Savani
(74) *Attorney, Agent, or Firm* — GableGotwals; David G. Woodral (57) ABSTRACT

A cooking grill has a firepot configured to burn pelletized fuel fed from an auger, a cooking grate above the firepot, and a double walled enclosure interposing the firepot and the cooking grate and containing and directing flow of combustion gases from the firepot up to the cooking grate.

18 Claims, 4 Drawing Sheets

(56) References Cited

U.S. PATENT DOCUMENTS

| | | | |
|---|---|---|---|
| 5,197,379 A * | 3/1993 | Leonard, Jr. | A47J 37/0704 126/25 R |
| 5,251,607 A | 10/1993 | Traeger et al. | |
| 5,429,110 A | 7/1995 | Burke et al. | |
| 5,490,452 A | 2/1996 | Schlosser et al. | |
| 5,809,991 A | 9/1998 | Pai | |
| 6,187,359 B1 | 2/2001 | Zuccarini | |
| 6,209,533 B1 | 4/2001 | Ganard | |
| 6,223,737 B1 | 5/2001 | Buckner | |
| 6,314,955 B1 | 11/2001 | Boetcker | |
| 6,336,449 B1 | 1/2002 | Drisdelle et al. | |
| 7,360,639 B2 | 4/2008 | Sprouse et al. | |
| 7,530,351 B2 | 5/2009 | Leverty | |
| D623,013 S | 9/2010 | Alden et al. | |
| 7,900,553 B1 | 3/2011 | Maurin | |
| 7,984,709 B1 | 7/2011 | Byrnes et al. | |
| 3,006,686 A1 | 8/2011 | Hunt et al. | |
| 8,267,078 B2 | 9/2012 | Kuntz | |
| D681,394 S | 5/2013 | Parel et al. | |
| 8,651,018 B1 | 2/2014 | Loud, III | |
| 8,899,145 B2 | 12/2014 | Harrison et al. | |
| 8,985,092 B2 | 3/2015 | Ahmed | |
| D760,539 S | 7/2016 | Colston | |
| 9,427,108 B2 | 8/2016 | Ahmed | |
| 9,441,838 B2 | 9/2016 | Baker | |
| 9,635,978 B2 | 5/2017 | Measom et al. | |
| 9,759,429 B2 | 9/2017 | Tucker | |
| 9,814,354 B2 | 11/2017 | McAdams et al. | |
| 9,913,559 B2 | 3/2018 | Polter et al. | |
| D817,091 S | 5/2018 | Colston | |
| 10,077,904 B2 | 9/2018 | Grant | |
| 10,201,247 B1 | 2/2019 | Jones | |
| 10,292,531 B1 | 5/2019 | Hancock et al. | |
| 10,495,317 B1 | 12/2019 | Hancock et al. | |
| D871,821 S | 1/2020 | Boltz et al. | |
| 10,670,276 B2 * | 6/2020 | Traeger | F24B 15/005 |
| D901,244 S | 11/2020 | Baker et al. | |
| D907,424 S | 1/2021 | Measom et al. | |
| D915,138 S | 4/2021 | Bennion et al. | |
| D921,413 S | 6/2021 | Fitzpatrick | |
| D927,917 S | 8/2021 | Yueh | |
| D935,840 S | 11/2021 | Carter et al. | |
| 11,166,590 B2 | 11/2021 | Zheng | |
| 11,181,276 B2 | 11/2021 | Colston et al. | |
| 11,181,277 B2 | 11/2021 | Donnelly et al. | |
| 11,206,948 B2 | 12/2021 | Measom et al. | |
| 11,231,178 B2 | 1/2022 | James | |
| D945,208 S | 3/2022 | Duan et al. | |
| 11,359,817 B2 | 6/2022 | Donnelly et al. | |
| 2001/0017131 A1 * | 8/2001 | Sim | A47J 37/0704 126/25 A |
| 2004/0226550 A1 | 11/2004 | Hutton et al. | |
| 2004/0255926 A1 * | 12/2004 | Waits | A23B 4/044 126/25 R |
| 2005/0126556 A1 | 6/2005 | Bossler | |
| 2008/0085172 A1 | 4/2008 | Harman et al. | |
| 2008/0098906 A1 | 5/2008 | Davis | |
| 2009/0013985 A1 | 1/2009 | Little et al. | |
| 2009/0056695 A1 | 3/2009 | Cosgrove | |
| 2009/0293860 A1 | 12/2009 | Carlson | |
| 2010/0218754 A1 | 9/2010 | Kuntz | |
| 2011/0073101 A1 | 3/2011 | Lau et al. | |
| 2011/0136066 A1 | 6/2011 | Geselle et al. | |
| 2011/0219957 A1 * | 9/2011 | Fogolin | A47J 37/0704 99/450 |
| 2011/0275023 A1 | 11/2011 | Knight | |
| 2013/0160757 A1 | 6/2013 | Atemboski et al. | |
| 2013/0298894 A1 | 11/2013 | Kleinsasser | |
| 2013/0327259 A1 | 12/2013 | Freeman | |
| 2014/0326232 A1 | 11/2014 | Traeger | |
| 2014/0326233 A1 | 11/2014 | Traeger | |
| 2014/0373827 A1 | 12/2014 | Zhu et al. | |
| 2014/0377431 A1 | 12/2014 | Kazerouni | |
| 2015/0079250 A1 | 3/2015 | Ahmed | |
| 2015/0136109 A1 | 5/2015 | Baker | |
| 2015/0182074 A1 | 7/2015 | Bucher et al. | |
| 2015/0320259 A1 | 11/2015 | Fucker | |
| 2016/0174767 A1 | 6/2016 | Schlosser et al. | |
| 2016/0245529 A1 | 8/2016 | McClean | |
| 2016/0255999 A1 | 9/2016 | McAdams et al. | |
| 2016/0327263 A1 | 11/2016 | Fraeger | |
| 2016/0341423 A1 | 11/2016 | Johnson | |
| 2017/0065124 A1 | 3/2017 | Colston | |
| 2017/0067649 A1 | 3/2017 | Colston | |
| 2017/0164783 A1 | 6/2017 | Sauerwein et al. | |
| 2017/0196400 A1 | 7/2017 | Colston | |
| 2017/0198917 A1 | 7/2017 | Gillespie et al. | |
| 2017/0219213 A1 | 8/2017 | Measom et al. | |
| 2017/0289257 A1 | 10/2017 | Colston | |
| 2017/0343218 A1 | 11/2017 | Tucker | |
| 2017/0370592 A1 | 12/2017 | Bogazzi | |
| 2018/0028018 A1 | 2/2018 | Barnett et al. | |
| 2018/0168397 A1 | 6/2018 | Colston | |
| 2018/0192822 A1 | 7/2018 | Cedar et al. | |
| 2018/0213970 A1 | 8/2018 | Colston | |
| 2018/0296031 A1 | 10/2018 | Terrell, Jr. et al. | |
| 2018/0317707 A1 | 11/2018 | Dahle | |
| 2018/0368617 A1 | 12/2018 | Allmendinger | |
| 2018/0368618 A1 | 12/2018 | Measom et al. | |
| 2019/0008321 A1 | 1/2019 | Allmendinger | |
| 2019/0282032 A1 | 9/2019 | Colston et al. | |
| 2019/0290064 A1 | 9/2019 | Colston et al. | |
| 2019/0290066 A1 | 9/2019 | Colston | |
| 2019/0293295 A1 | 9/2019 | Colston et al. | |
| 2019/0365152 A1 | 12/2019 | Dahle et al. | |
| 2019/0374065 A1 | 12/2019 | Hancock et al. | |
| 2019/0387924 A1 | 12/2019 | Zheng | |
| 2020/0086780 A1 | 3/2020 | Baker et al. | |
| 2020/0116349 A1 | 4/2020 | Rahmani et al. | |
| 2020/0158337 A1 | 5/2020 | Baker et al. | |
| 2020/0214501 A1 | 7/2020 | Gafford et al. | |
| 2020/0237148 A1 | 7/2020 | Donnelly | |
| 2020/0333011 A1 | 10/2020 | Ahmed et al. | |
| 2021/0267413 A1 | 9/2021 | Roberts et al. | |
| 2021/0298333 A1 | 9/2021 | Strong et al. | |
| 2021/0341144 A1 | 11/2021 | Parsons et al. | |
| 2021/0356130 A1 | 11/2021 | Li | |
| 2021/0361115 A1 | 11/2021 | Colston et al. | |
| 2022/0046937 A1 | 2/2022 | Simon et al. | |
| 2022/0082262 A1 | 3/2022 | Colston et al. | |

FOREIGN PATENT DOCUMENTS

| | | |
|---|---|---|
| DE | 4020171009570011 S | 6/2018 |
| WO | 2013116946 A1 | 8/2013 |
| WO | 2017044598 A1 | 3/2017 |
| WO | 2017064528 A1 | 4/2017 |
| WO | 2018125681 A1 | 7/2018 |
| WO | 2018208919 A1 | 11/2018 |
| WO | PCT/US2020/035535 | 10/2020 |
| WO | PCT/US2021/020303 | 5/2021 |

OTHER PUBLICATIONS

Char-Broil_ W.C. Bradley Co, W.C. Bradley, [online], [site visited Jan. 24, 2022], Available from internet URL: https://www.wcbradley.com/divisions/char-broil (Year: 2022).

Rider 900 Pellet Grill, Oklahoma Joes, [online], [site visited Jan. 24, 2022], Available from internet URL: https://www.oklahomajoes.com/rider-900-pellet-grill (Year: 2022).

European Search Report, Application No. 19871042.8, W.C. Bradley Co., Published Jun. 30, 2022.

May 7, 2020, Publisher: International Search Report issued by the ISA/US for PCT/US2020/020487 dated May 7, 2020.

* cited by examiner

PELLET GRILL

CROSS-REFERENCE TO RELATED CASES

This application claims the benefit of U.S. provisional patent application Ser. No. 62/745,046, filed on Oct. 12, 2018, and incorporates such provisional application by reference into this disclosure as if fully set out at this point.

FIELD OF THE INVENTION

This disclosure relates to solid fuel cooking in general and, more particularly, to systems for cooking using solid fuel pellets.

BACKGROUND OF THE INVENTION

Outdoor wood pellet fired cooking and smoking appliances are described, for example, in U.S. Pat. Nos. 4,823,684 and 5,251,607, both to Joseph Traeger, et al. Over the years there have been many improvements and variations of these products made but their essential principal of operation remains the same. An electrically driven auger transports small compressed wood pellets from an exterior hopper to a typically open top cylindrical combustion chamber, or firepot, inside an enclosed cooking chamber with an openable lid. This combustion chamber is supplied with combustion air pressurized and driven by an exterior fan through ductwork to an area surrounding the firepot and then though holes in the exterior of the firepot feeding air into the combustion space. The hot gas from the firepot is conveyed through a series of baffles to a cooking grate placed above the firepot and baffles where it heats the food placed on the cooking grate.

Such appliances may be used to cook meat, often in large pieces, such as roasts or briskets. Cooking may take place for long periods of time (on the order of hours), at low to moderate temperatures of 200° F. to 400° F. Sizes of appliances and cooking surfaces may vary as there is a desire to accommodate large quantities of meat. To provide even cooking across the cooking grate area, the set of baffles above the firepot must be optimized to produce a relatively low thermal intensity in terms of energy output per unit of area. However, the temperatures attained at the cooking grate are linearly proportional to the thermal intensity. Temperatures of 600° F. to 800° F. needed to provide searing while grilling smaller pieces of meat such as steaks or hamburgers for a shorter period of time (on the order of minutes) requires a much higher energy output per area.

Using appliances having a relatively large cooking area (common in the marketplace) it may become very difficult to obtain these higher thermal intensities simply by upsizing, or by more rapidly running the auger feed from the pellet hopper. Such difficulty is, first of all, based on the problem of evenly distributing heat from a concentrated heat source (e.g., a single firepot), to a large, typically rectangular, cooking area without absorbing or losing too much heat in the baffle structure necessary to accomplish this. A second difficulty, from a commercial point of view, is the expense of scaling up the auger drive and combustion air fan delivery and firepot structure. Thus, it has remained the case that most such pellet appliances described do not perform well for grilling, particularly in providing high cooking grate temperatures to create searing action on the exterior.

What is needed is a system and device for addressing the above, and related, problems.

SUMMARY OF THE INVENTION

The invention of the present disclosure, in one aspect thereof, comprises a cooking grill having a firepot configured to burn pelletized fuel fed from an auger. The cooking grill has a cooking grate above the firepot. A double walled enclosure interposes the firepot and the cooking grate and contains and directs flow of combustion gases from the firepot up to the cooking grate.

In some embodiments, the firepot has an exhaust opening from which combustion gases flow. An area defined by the exhaust opening may be smaller than an area defined by the cooking grate.

In some cases, the double walled enclosure encloses a volume between the firepot and cooking grate through which the exhaust gases flow and prevents the combustion gases from escaping the cooking grill unless first flowing through the cooking grate. The double walled enclosure may also further comprise an inner wall spaced apart from an outer wall. The inner and outer wall may define an airspace therebetween. In some embodiments, a space between the inner and outer walls is filled with a solid or other type of insulation material.

Some embodiments of the cooking grill include a pyramidal baffle inside the double walled enclosure for arresting sparks and embers flowing upward from the firepot. The baffle may be affixed to an interior wall of the double walled enclosure. The interior wall of the double walled enclosure may define a rectilinear cross section in a horizontal plane therethrough. The baffle may extend from the interior wall toward a center of the volume enclosed by the double walled enclosure.

Some embodiments of the cooking grill further comprising a drip tray at a bottom of the double wall enclosure surrounding the firepot. A lip may be situated proximate the firepot to prevents drippings on the drip tray from running into the firepot.

The invention of the present disclosure, in another aspect thereof, comprises a cooking grill having a firebox containing a pellet burning firepot that is fed pelletized solid fuel from an auger and fed combustion air under positive pressure from outside the cooking grill. The cooking grill has a food grate heated by combustion gases from the firepot and selectively coverable by a lid hingedly attached to the firebox. The grill includes a double walled structure accepting the combustion gases at a first lower end and preventing escape of the combustion gases until the combustion gases reach the food grate. The double walled structure has a horizontal cross section at a lower portion that defines a smaller area than a horizontal cross section at an upper portion.

In some embodiments of the instant cooking grill, the double walled structure comprises an inner wall spaced from an outer wall with air between the inner wall and outer wall. In some cases, insulating material is placed between the inner wall and outer wall.

The cooking grill may contain a baffle inside the double walled structure. A drip tray may also be provided under the double walled structure and surrounding a top portion of the firepot. There may be a lip on the drip tray preventing drippings from running into the firepot.

The invention of the present disclosure, in another aspect thereof, comprises a cooking grill having a firebox supporting a food grate and containing a firepot fueled by solid pellet fuel and receiving combustion air under positive pressure. The grill has a double walled structure inside the firebox interposing the firepot and the food grate, the double walled structure defining a manifold directing combustion gases from the firepot to the fuel grate. The cooking grill has a peaked baffle inside the double walled structure manifold placed to arrest movement of sparks and solid matter rising from the firepot, and a drip tray surrounding the firepot and having a lip placed to prevent drippings from the drip tray from moving into the firepot.

In some embodiments, a combustion outlet opening of the firepot is of a smaller area than an area defined by the cooking grate and the double walled structure is shaped to allow the combustion gases to expand to pass through substantially all of the food grate without substantial loss of combustion gases prior to reaching the food grate. In some cases, the double walled structure is insulated to reduce heat loss.

DETAILED DESCRIPTION OF THE PREFERRED EMBODIMENTS

Figure 1:
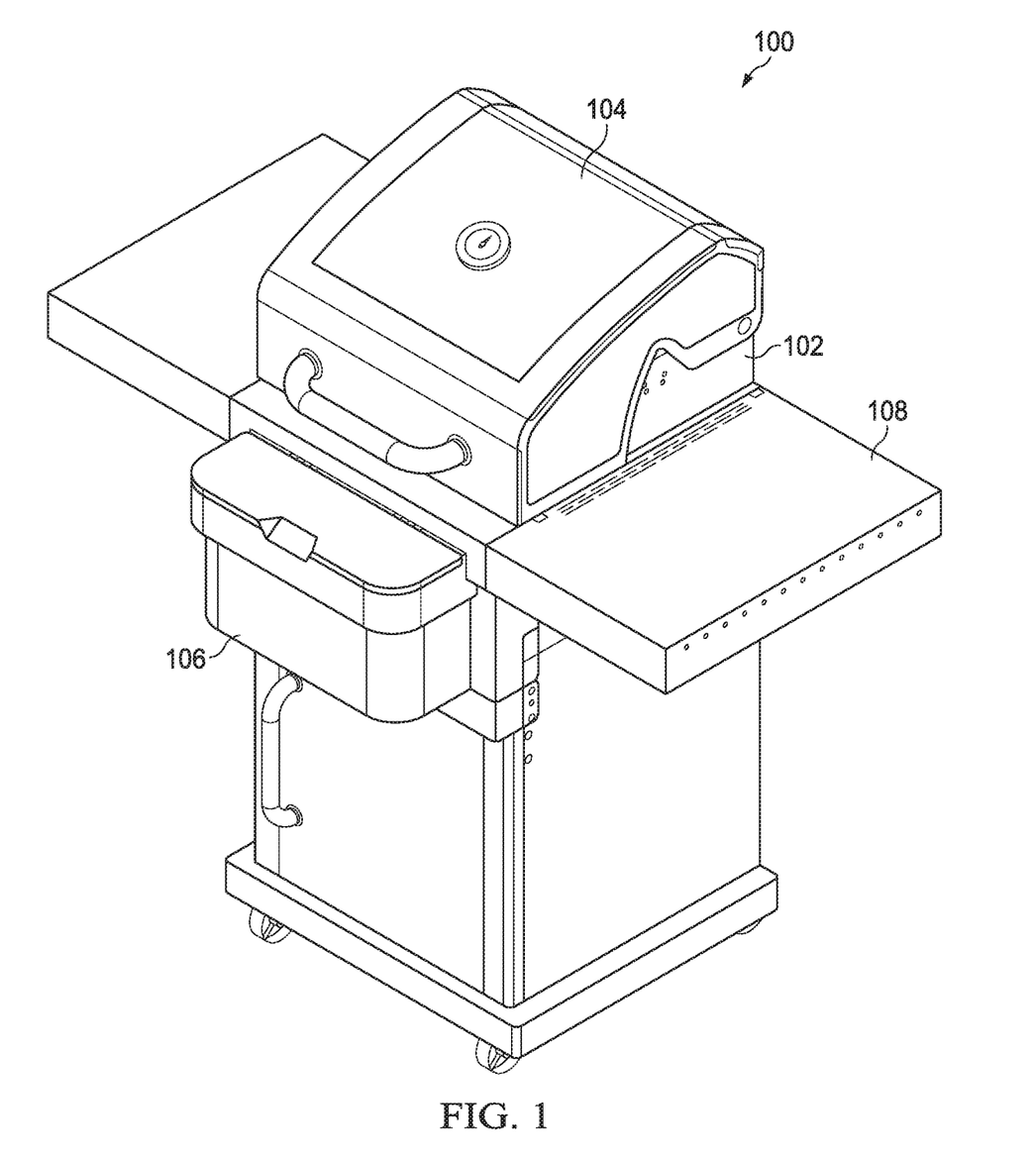
FIG. 1 is a perspective view of a cooking grill according to aspects of the present disclosure.

Referring now to FIG. 1, a perspective view of a cooking grill according to aspects of the present disclosure is shown. From the exterior, the grill 100 can be seen to comprise a firebox 102 with an openable lid 104. The lid 104 may be hinged from the back and have a handle for opening and closing. A front pellet feeding hopper system 106 can be seen where the user feeds fuel pellets for auguring into the firebox for combustion. The pellet feeding hopper system 106 or another such system may also be mounted to the back, left side or right side of the grill 100. Side shelves 108 and other helpful implements may be provided in various embodiments.

Figure 2:
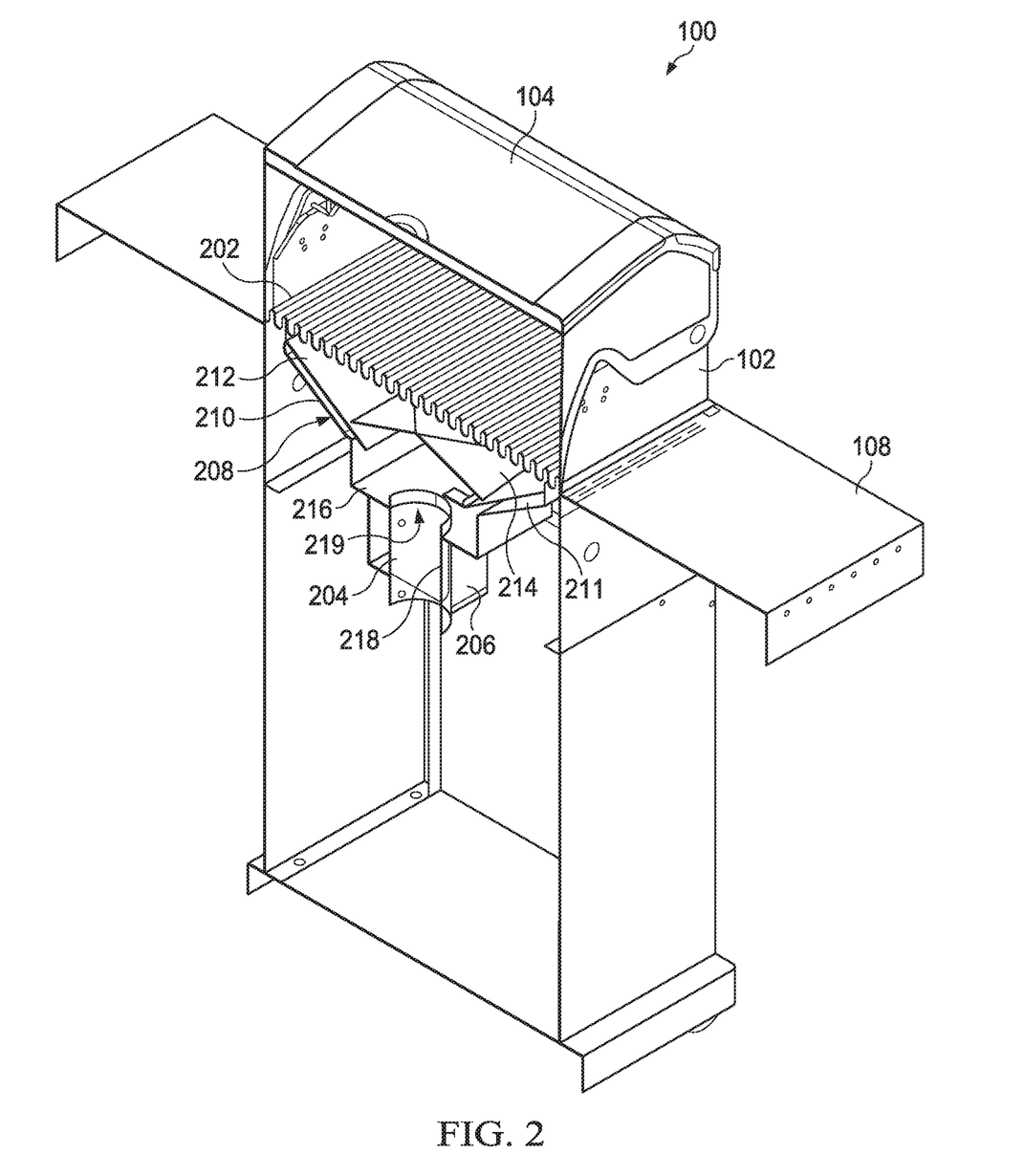
FIG. 2 is a front perspective cutaway view of the cooking grill of FIG. 1.
Figure 3:
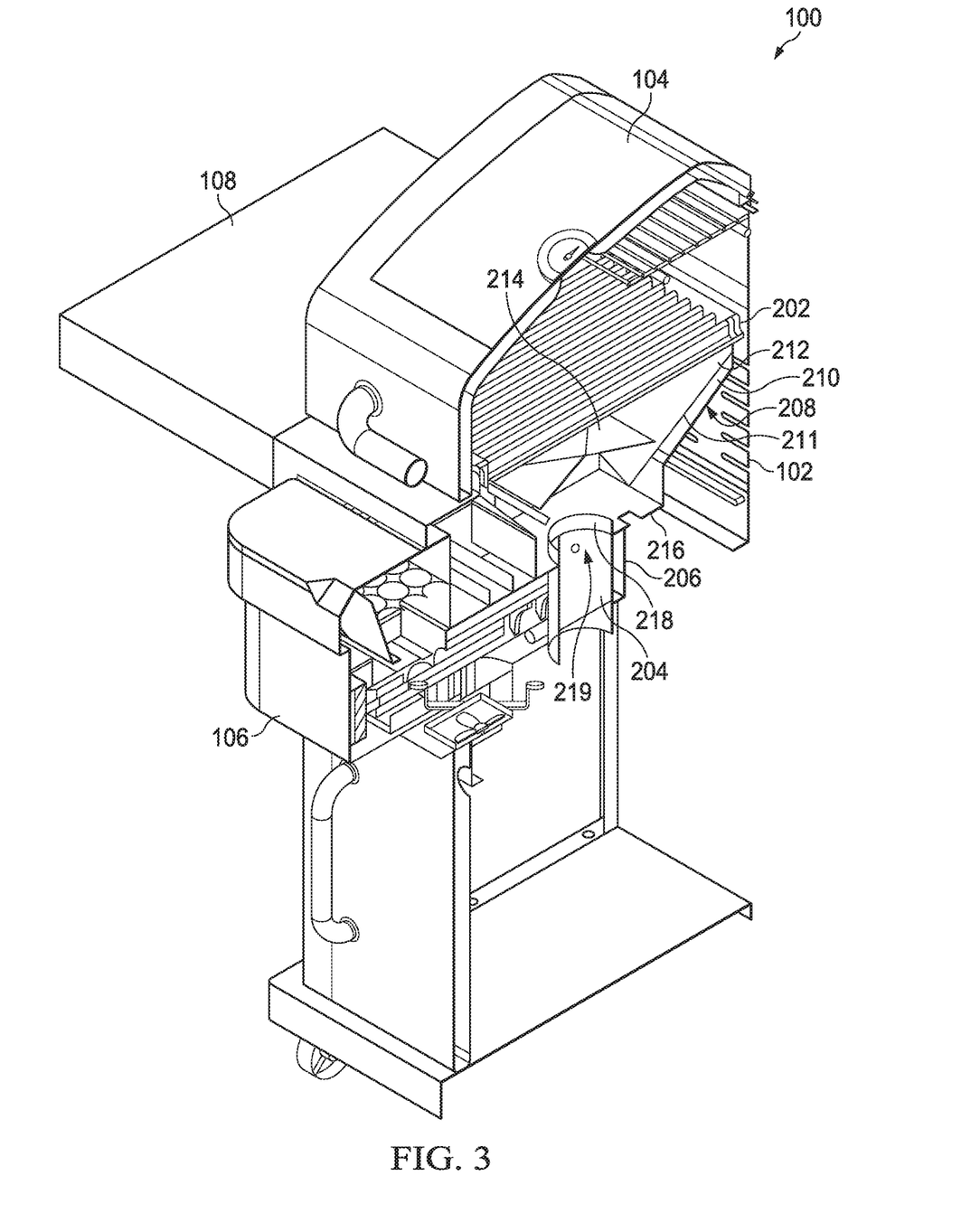
FIG. 3 is a side perspective cutaway view of the cooking grill of FIG. 1.

FIG. 2 is a front perspective cutaway view of the cooking grill of FIG. 1. FIG. 3 provides a complementary side perspective cutaway view. Here the interior of the firebox 102 can be seen, including a cooking grate 202 placed above a heat or combustion source. In the present embodiment, the heat source includes a firepot 204. The firepot 204 may have perforations or air openings for receiving combustion air from an air duct 206. In some embodiments, air in the duct 206 is pressurized to drive air into the firepot 204 to control or enhance the combustion of wood pellets or other fuel in the firepot 204. Fuel may be driven into the firepot 204 by an auger or other motive device and may be controlled by a user, thereby providing additional control over the heat and combustion within the firebox 102. Heated combustion gases may flow from the firepot 204 via exhaust or combustion opening 219. In some embodiments the opening 219 is round corresponding with an overall cylindrical shape of the firepot 204.

A double walled enclosure 208 provides for transport of heated gases and combustion products from the firepot 204 to the cooking grate 202. It will be appreciated that an area defined by the opening 219 may be much smaller in area that the cooking grate 202. As the firepot 204 may be a relatively small and/or concentrated heat and combustion source relative to the surface area of the cooking grate 202, the double walled enclosure 208 provides for transport of the combustion products and heat from the firepot 204 to the cooking grate 202 in such a manner as to heat most or all of the cooking grate 202 to a high temperature suitable for grilling.

The double walled enclosure may be thought of as a manifold for transport of the heated gas and combustion products to the cooking grate 202. With the decrease in thermal loss into the firebox 102 and out of the same from the concentrated heat source of the firepot 204 the firepot 204 provides sufficient heat not only for low temperature slow cooking, but also and for higher temperature grilling and searing operations at the cooking grate 202.

The double walled enclosure 208 may provide an outer wall 210 with an inner wall 212 nested therein but spaced apart therefrom. An insulating air space 211 may thereby be defined between the inner wall 210 and outer wall 212. In some embodiments, the space 211 is not empty or air-filled but filled with an insulating material. The insulating material may comprise ceramic mineral wool type insulation, a high temperature aerogel, or some other form of additional heat barrier interposed between the inner wall 210 and the outer wall 212. In some embodiments, only a portion of the space 211 may be insulated (for example, nearest to the cooking grate 202 or nearest to the firepot 204).

In some embodiments, the enclosure 208 is double walled across all of the vertical distance between the firepot 204 and the cooking grate 202. In other embodiments, the enclosure spans the entire vertical space, but is double walled across only a portion of the vertical distance (e.g., nearest the cooking grate 202, for example). It may also be double walled only on a lower portion, or only on a medial portion. In some embodiments, the inner wall 212 may be equidistantly spaced from the outer wall 210. In other embodiments the walls 210, 212 may be spaced closer together near the cooking grate 202 or lower near the firepot 204.

In some embodiments, a drip pan 216 sits below the double walled enclosure 208 and joins to the firepot 204. The drip pan 216 may collect any grease or other drippings from the cooking grate 202 that may run down the inner wall 212 toward the firepot 204. In some embodiments, a lip 218 surrounds the top opening of the firepot 204 to prevent collected grease from running into the firepot 204 and affecting heat or burn characteristics. The drip pan 216 may be removable, or provide drainage holes into a catch cup or the like for emptying grease and other accumulations.

As discussed above, certain ash and coal particles may escape from the firepot 204 during combustion. These may tend to travel upwardly with the convection currents of the heated gases. A baffle 214 may be provided within the enclosure 208 to help arrest such particles. The baffle 214 may be a single or multi-piece component. In some embodiments, it is located within and affixed to the inner wall 212 of the enclosure 208. The enclosure 208 may be generally square or rectangular in horizontal cross section to conform to the square or rectangular shape that may be seen in the cooking grate 202, and to guide gases from the firepot 204 accordingly. The baffle 214 may be configured to extend horizontally from the relatively flat sides of the inner wall 212, and/or from the "corners" of the inner wall 212 as a horizontal rectilinear cross section is defined by the inner wall 212.

Figure 4:
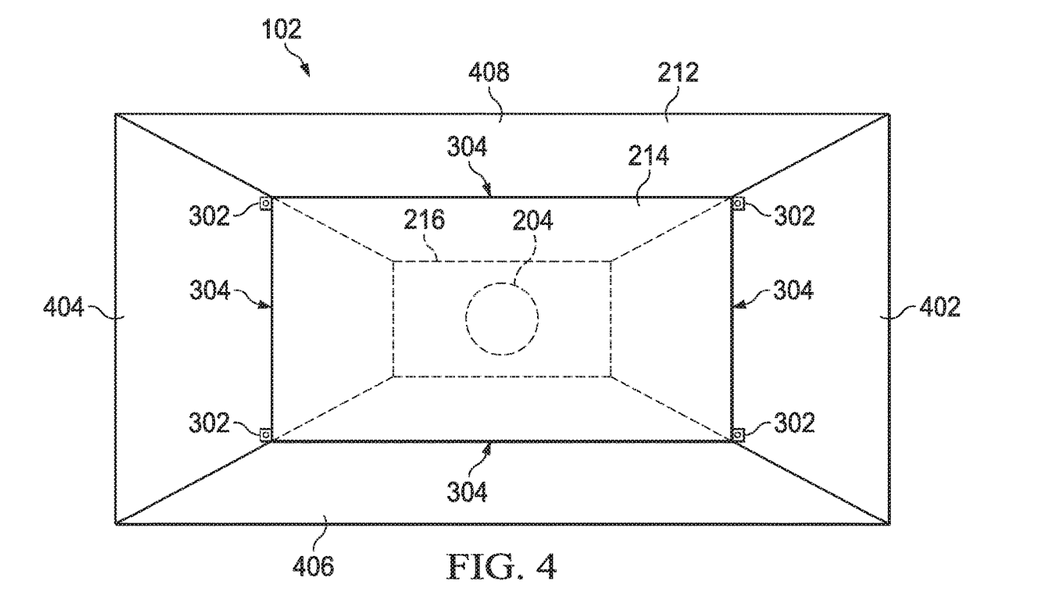
FIG. 4 is a top down view into the firebox of the cooking grill of FIG. 1 with a baffle ghosted to show components below.

FIG. 4 is a top down view into the firebox of the cooking grill of FIG. 1 with the baffle 214 ghosted to show components placement. Viewed from above, the baffle 214 has a rectilinear outline. The baffle 214 may be centered over the firepot 204, which may be centered in the drip tray 216. However, these components are not necessarily centered in all embodiments. In some embodiments, the inner wall 212 may comprise four downward sloped planar panels 402, 404, 406, 408, which may correspond to right, left, front, and back sides, respectively (if viewed, for example, from the front of the cooking grill 100). It should be understood that the outer wall 210 may be comprised of corresponding panels.

It should also be understood that the illustrated embodiments of the present disclosure describe an enclosure 208 having a rectilinear cross section. This configuration accommodates a rectangular cooking grate 202 and is at least partially responsible for the ability of systems of the present disclosure to evenly heat a large cooking grate having a shape different from that of the firepot 204 (e.g., round). However, in embodiments where a round cooking grate is provided, the enclosure 208 and baffle 214 may have a corresponding round horizontal cross section. In other embodiments, it may be that only a portion of the cooking grate 202 would be heated by the firepot 204 such that the horizontal cross section of the enclosure 208 may not directly correspond directly to the shape or dimensions of the cooking grate 202.

Standoffs 302 may be provided that affix the baffle 214 to one or more of the panels 402, 404, 406, 408 of the inner wall 212. Thus gaps 304 may be provided interposing the baffle 214 and one or more of the panels 402, 404, 406, 408. The gaps 304 allow for flow of combustion gases but the baffle 214 itself impedes flow of cinders and other solid particles. The gaps 304 also allow for liquids and other materials that might fall through the cooking grate 202 to be directed to the drip tray 216 but away from the firepot 204. The gaps 304 may not be uniform between the baffle 214 and one or more of the panels 402, 404, 406, 408. Further, spacing between the baffle 214 and one or more of the panels 402, 404, 406, 408 may vary within a particular gap 304. In some embodiments, gaps 304 are only present between one, two, or three of the 402, 404, 406, 408 and the baffle 214 (in other words the baffle 214 may attach to one or more of the panels 402, 404, 406, 408 such that there is no gap at such panel).

Figure 5:
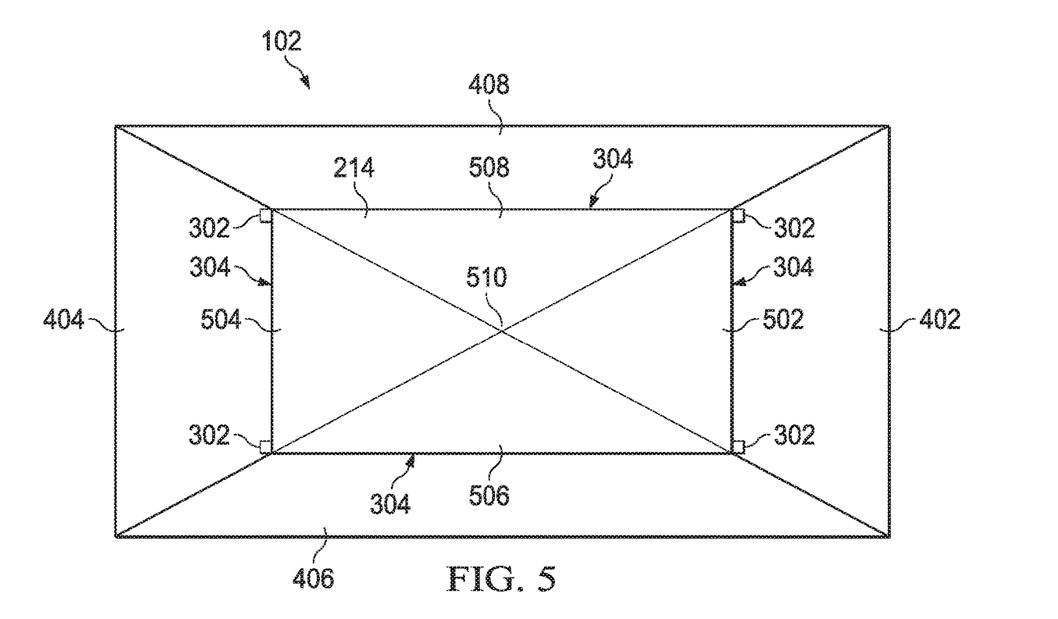
FIG. 5 is a top down view into the firebox of the cooking grill of FIG. 1.

FIG. 5 is a top down view into the firebox 102 of the cooking grill 100 of FIG. 1. As can be seen from this viewpoint in conjunction with the perspective views of FIGS. 2-3, the baffle 214 may have a pyramidal shape with four walls 502, 504, 506, 508 rising upward toward the cooking grate 202 from near the respective panels 402, 404, 406, 408 of the inner wall 212 of the enclosure 208. In some embodiments, each panel 402, 404, 406, 408 is spaced apart from each wall 502, 504, 506, 508 with a standoff 302, spacing fastener, or the like such that there is a gap 304 between each respective panel/wall pair. This may promote even heating of the cooking grate 202. However, in other embodiments, gaps 304 may not be provided between each panel/wall pair. Additionally, the baffle 214 may not attach to each of the four panels 402, 404, 406, 408 although in some embodiments this promotes stability of the baffle 214.

The four walls 502, 504, 506, 508 may meet at an apex 510 corresponding to the upper most point of the baffle 214. The baffle 214, in addition to trapping cinders, ash, and other solid particles and preventing them from reaching the cooking grate 202, may also serve as a thermal re-emitter. As the baffle 214 is heated from combustion gases, it may radiate a significant amount of heat toward the cooking grate 202. Furthermore, the baffle 214 may serve as a vaporizer plate that converts fat or other drippings to smoke to enhance flavor of food being cooked on the cooking grate 202. Finally, the sloped walls 502, 504, 506, 508 guide anything falling onto the baffle 214 that is not vaporized onto the respective panels 402, 404, 406, 408 of the inner wall 212 where they may fall onto the drip tray 216.

It should be appreciated that the baffle 214 may be the only baffle between the firepot 204 and the cooking grate 202. In some embodiments, the baffle 214 is imperforate and does not admit any combustion products therethrough (in other words, all gas air or fluid flow from the firepot to the cooking grate 202 is via the one or more gaps 304). In other embodiments the baffle 214 could have openings or apertures (not shown) to redistribute convective heat from the combustion gases produced in the firepot 204. Such openings may take the form of piercings, holes of various shapes, grids, screens, hooded openings, louvres, or other openings. In other embodiments, openings through the baffle 214 may take the form of a pipe, tunnel, or tortured path such that some convection gases may flow through but solid materials such as cinders and ash are not likely to flow through.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A cooking grill comprising:
   a firepot configured to burn pelletized fuel fed from an auger;
   a cooking grate above the firepot;
   a double walled enclosure interposing the firepot and the cooking grate, having an increasing horizontal cross-sectional air flow area from the firepot to the cooking grate, and containing and directing flow of combustion gases from the firepot up to the cooking grate; and
   an imperforate pyramidal baffle inside the double walled enclosure oriented to guide gases rising from the firepot within the double walled enclosure;
   wherein the pyramidal baffle extends horizontally over at least part of the double-walled enclosure.

2. The cooking grill of claim 1 wherein the firepot has an exhaust opening from which combustion gases flow, an area defined by the exhaust opening being smaller than an area defined by the cooking grate.

3. The cooking grill of claim 2, wherein the double walled enclosure encloses a volume between the firepot and cooking grate through which the exhaust gases flow and prevents the combustion gases from escaping the cooking grill unless first flowing through the cooking grate.

4. The cooking grill of claim 3, wherein the double walled enclosure further comprises an inner wall spaced apart from an outer wall, the inner and outer wall defining an airspace therebetween.

5. The cooking grill of claim 3, wherein the double walled enclosure further comprises an inner wall spaced apart from an outer wall, a space between the inner and outer walls being filled with an insulation material.

6. The cooking grill of claim 1, wherein the baffle is affixed to an interior wall of the double walled enclosure.

7. The cooking grill of claim 6, wherein the interior wall of the double walled enclosure defines a rectilinear cross section in a horizontal plane therethrough.

8. The cooking grill of claim 7, wherein the baffle extends from the interior wall toward a center of the volume enclosed by the double walled enclosure.

9. The cooking grill of claim 3, further comprising a drip tray at a bottom of the double wall enclosure surrounding the firepot.

10. The cooking grill of claim 9, further comprising a lip placed proximate the firepot that prevents drippings on the drip tray from running into the firepot.

11. A cooking grill comprising:
    a firebox containing a pellet burning firepot fed pelletized solid fuel from an auger and fed combustion air under positive pressure from outside the cooking grill;
    a food grate heated by combustion gases from the firepot and selectively coverable by a lid hingedly attached to the firebox; and
    a double walled structure accepting the combustion gases at a first lower end and preventing escape of the combustion gases until the combustion gases reach the food grate at a second upper end;
    a horizontal baffle affixed to and extending from the double walled structure over the firepot and comprising an imperforate thermal re-emitter;
    wherein the double walled structure has a horizontal cross section at the first lower end that defines a smaller air flow passage area than a horizontal cross section at the second upper end.

12. The cooking grill of claim 11, wherein the double walled structure comprises an inner wall spaced from an outer wall with air between the inner wall and outer wall.

13. The cooking grill of claim 11, wherein the double walled structure comprises an inner wall spaced from an outer wall with insulating material between the inner wall and outer wall.

14. The cooking grill of claim 11, further comprising a drip tray under the double walled structure and surrounding a top portion of the firepot.

15. The cooking grill of claim 14, further comprising a lip on the drip tray preventing drippings from running into the firepot.

16. A cooking grill comprising:
    a firebox supporting a food grate and containing a firepot fueled by solid pellet fuel and receiving combustion air under positive pressure;
    a double walled structure inside the firebox and interposing the firepot and the food grate, the double walled structure defining a manifold directing combustion gases from the firepot to the food grate and having an increasing horizontal cross section for air flow from the firepit and to food grate;
    a peaked baffle affixed to the double walled structure manifold by a plurality of standoffs creating a space between the peaked baffle and the double walled structure, the peaked baffle being placed horizontally over the firepot to guide combustion gasses and arrest movement of sparks and solid matter rising from the firepot; and a drip tray surrounding the firepot and having a lip placed to prevent drippings from the drip tray from moving into the firepot.

17. The cooking grill of claim 16, wherein a combustion outlet opening of the firepot is of a smaller area than an area defined by the cooking grate and the double walled structure is shaped to allow the combustion gases to expand to pass through substantially all of the food grate without substantial loss of combustion gases prior to reaching the food grate.

18. The cooking grill of claim 17, wherein the double walled structure is insulated to reduce heat loss.

* * * * *